(12) United States Patent
Yang et al.

(10) Patent No.: US 12,483,028 B2
(45) Date of Patent: Nov. 25, 2025

(54) PROTECTIVE CIRCUIT CAPABLE OF PREVENTING ERROR VOLTAGE ACCESS

(71) Applicant: KEBODA TECHNOLOGY CO., LTD, Shanghai (CN)

(72) Inventors: Cai Yang, Shanghai (CN); Yuping Kan, Shanghai (CN)

(73) Assignee: KEBODA TECHNOLOGY CO., LTD, Shanghai (CN)

( * ) Notice: Subject to any disclaimer, the term of this patent is extended or adjusted under 35 U.S.C. 154(b) by 69 days.

(21) Appl. No.: 18/690,999

(22) PCT Filed: Mar. 2, 2022

(86) PCT No.: PCT/CN2022/078750
§ 371 (c)(1),
(2) Date: Mar. 11, 2024

(87) PCT Pub. No.: WO2023/092883
PCT Pub. Date: Jun. 1, 2023

(65) Prior Publication Data
US 2024/0380199 A1    Nov. 14, 2024

(30) Foreign Application Priority Data
Nov. 29, 2021   (CN) .......................... 202111473414.2

(51) Int. Cl.
*H02H 11/00*    (2006.01)
*H02H 1/00*    (2006.01)
*H02H 3/20*    (2006.01)

(52) U.S. Cl.
CPC ........ *H02H 11/006* (2013.01); *H02H 1/0007* (2013.01); *H02H 3/20* (2013.01)

(58) Field of Classification Search
CPC ...... H02H 11/006; H02H 1/0007; H02H 3/20; H02H 11/00; H02H 3/22; H02H 9/04; H02H 7/06; H02H 7/065; H02M 3/335
See application file for complete search history.

(56) References Cited

U.S. PATENT DOCUMENTS 6,972,940 B2 * 12/2005 Tsukasaki .............. H02H 3/207
361/90
2003/0218843 A1    11/2003 Tsukasaki et al.

FOREIGN PATENT DOCUMENTS

CN          104113038 A     10/2014
CN          208479167 U      2/2019
(Continued)

OTHER PUBLICATIONS

International Search Report (with English translation) and Written Opinion issued in PCT/CN2022/078750, dated Aug. 10, 2022, 8 pages provided.

*Primary Examiner* — Monica Lewis
*Assistant Examiner* — Nicolas Bellido
(74) *Attorney, Agent, or Firm* — HSML P.C.

(57) ABSTRACT

A protective circuit capable of preventing error voltage access, comprising a first unidirectional conduction element, a triode control circuit, a first triode, a first capacitor, a Darlington transistor, a first resistor, a second resistor, and a relay. A contact of the relay is connected in series between an input end and an output end. The first unidirectional conduction element has a first end connected to the input end and a second end that is connected to a first end of each of the first resistor, the first triode, the first capacitor, and the Darlington transistor, respectively. The triode control circuit is connected to a second end of the first resistor and a controlled end of the first triode, respectively, and a second end of the Darlington transistor is connected to a controlled (Continued)

end of the relay. According to the present invention, the input end can be disconnected from the output end when an error voltage is input.

12 Claims, 2 Drawing Sheets

(56) References Cited

FOREIGN PATENT DOCUMENTS

| | | | |
|---|---|---|---|
| CN | 208623331 A | | 3/2019 |
| CN | 208623331 U | * | 3/2019 |

* cited by examiner

PROTECTIVE CIRCUIT CAPABLE OF PREVENTING ERROR VOLTAGE ACCESS

FIELD OF THE INVENTION

The invention relates to protective circuit techniques.

BACKGROUND OF THE INVENTION

With the development of intellectualization and electrification of automobiles, power connection is needed in more and more cases, and it has become a common phenomenon to charge automobiles by a mains supply or a high-voltage DC power supply. The power interface on many automobiles is a low-voltage power interface with an operating voltage of 12V or 24V, and in case of mistaken access of a high DC voltage and an AC voltage (including the mains voltage) to the low-voltage power interface, a low-voltage controller and low-voltage electric devices in the automobile will be damaged and even a fire may be caused if no error voltage access protection is available. Interface protection devices on the present market, such as piezoresistors, TVS diodes and fuses, can only protect against short-time surge voltages and cannot protect against long-term error access of high DC and AC voltages.

SUMMARY OF THE INVENTION

The technical issue to be settled by the invention is to provide a protective circuit capable of preventing error voltage access, which can disconnect an input end from an output end when an input voltage is an error voltage, to prevent the error voltage from being transmitted to the output end, thus preventing the error voltage from being accessed to post-electric devices and guaranteeing the power supply reliability and safety of the post-electric devices, and has a low implementation cost.

A protective circuit capable of preventing error voltage access according to the embodiments of the invention comprises a voltage input end, a voltage output end, a first unidirectional conduction element, a triode control circuit, a first triode, a first capacitor, a Darlington transistor or a second triode, a first resistor, a second resistor, and a relay; a normally open contact of the relay is connected in series between the voltage input end and the voltage output end; the first unidirectional conduction element has a first end and a second end and allows a current to flow from the first end to the second end, the first end of the first unidirectional conduction element is connected to the voltage input end, and the second end of the first unidirectional conduction element is connected to a first end of the first resistor, a first end of the first triode, a first end of the first capacitor, and a first end of the Darlington transistor or the second triode respectively; a first conduction end of the triode control circuit is connected to a second end of the first resistor and a controlled end of the first triode respectively, and a second conduction end of the triode control circuit is grounded; the triode control circuit is used for disconnecting the first conduction end from the ground when a voltage of the voltage input end is lower than or equal to a preset voltage, and connecting the first conduction end to the ground to turn on the first triode when the voltage of the voltage input end is higher than the preset voltage; a first end of the second resistor is connected to a common contact of a second end of the first triode, a second end of the first capacitor and a controlled end of the Darlington transistor or the second triode, and a second end of the second resistor is grounded; a second end of the Darlington transistor or the second triode is connected to a controlled end of the relay.

The invention has at least the following advantages:

1. The protective circuit according to the embodiments of the invention is composed of a few of discrete devices, thus being low in cost; when a high DC voltage or an AC voltage within a preset frequency range is input, the relay will be turned off to cut off voltage output, thus comprehensively protecting post-electric devices;
2. The protective circuit according to the embodiments of the invention uses the relay as a switch and makes full use of the advantages of high voltage resistance and small on-resistance of the relay, thus having high comprehensive cost performance;
3. The protective circuit according to the embodiments of the invention uses unidirectional conduction elements and triodes that can withstand high voltages, thus being able to protect against high DC and AC voltages at a low cost.
4. The protective circuit according to the embodiments of the invention can protect against long-term error access of high DC and AC voltages.

BRIEF DESCRIPTION OF THE DRAWINGS

The invention is further described below in conjunction with the accompanying drawings.

DETAILED DESCRIPTION OF THE PREFERRED EMBODIMENT

The invention is described in detail below in conjunction with accompanying drawings and specific embodiments.

Figure 1:
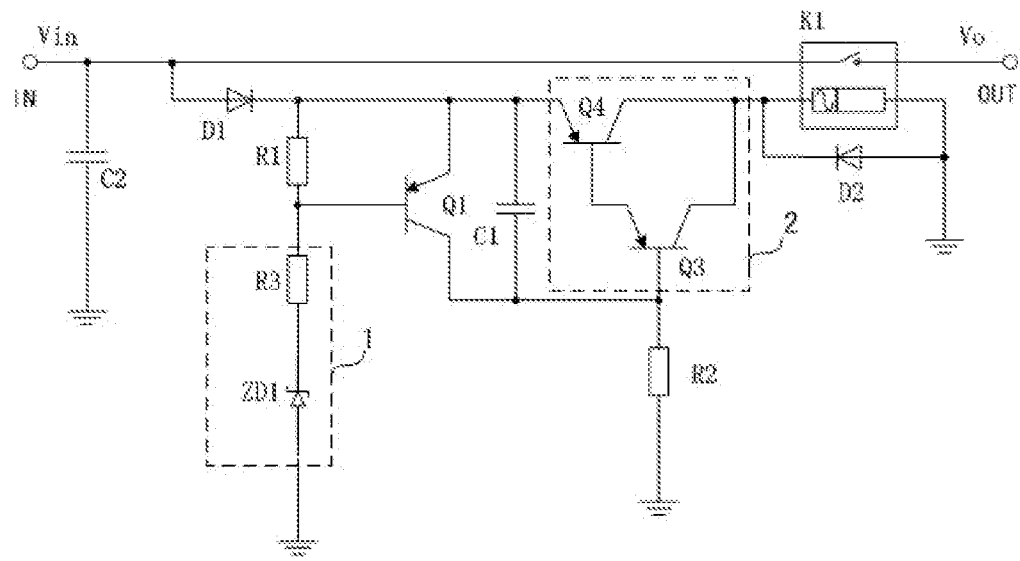
FIG. 1 illustrates a circuit diagram of a protective circuit capable of preventing error voltage access according to a first embodiment of the invention.

FIG. 1 illustrates a circuit diagram of a protective circuit capable of preventing error voltage access according to a first embodiment of the invention. Referring to FIG. 1, the protective circuit capable of preventing error voltage access according to the first embodiment of the invention comprises a voltage input end IN, a voltage output end OUT, a first unidirectional conduction element D1, a triode control circuit 1, a first triode Q1, a first capacitor C1, a Darlington transistor 2, a first resistor R1, a second resistor R2, and a relay K1.

A normally open contact of the relay K1 is connected in series between the voltage input end IN and the voltage output end OUT. Wherein, one end of the normally open contact of the relay K1 is connected to the voltage input end IN, and the other end of the normally open contact of the relay K1 is connected to the voltage output end OUT.

The first unidirectional conduction element D1 has a first end and a second end and allows a current to flow from the first end to the second end, the first end of the first unidirectional conduction element D1 is connected to the voltage input end IN, the second end of the first unidirectional conduction element D1 is connected to a first end of the first resistor R1, a first end of the first triode Q1, a first end of the first capacitor C1 and a first end of the Darlington transistor 2 respectively. In this embodiment, the first unidirectional conduction element D1 is composed of a first diode D1, an anode of the first diode D1 forms the first end of the first unidirectional conduction element, and a cathode of the first diode D2 forms the second end of the first unidirectional conduction element.

A first conduction end of the triode control circuit 1 is connected to a second end of the first resistor R1 and a controlled end of the first triode Q1 respectively, and a second conduction end of the triode control circuit 1 is grounded. The triode control circuit 1 is used for disconnecting the first conduction end from the ground when a voltage of the voltage input end is lower than or equal to a preset voltage, and connecting the first conduction end to the ground to turn on the first triode Q1 when the voltage of the voltage input end is higher than the preset voltage. The first resistor R1 has a voltage-dividing and resistance-biasing function.

In this embodiment, the triode control circuit 1 comprises a third resistor R3 and a voltage stabilizing diode ZD1, a first end of the third resistor R3 is connected to the second end of the first resistor R1 and the controlled end of the first triode Q1 respectively, a second end of the third triode R3 is connected to a cathode of the voltage stabilizing diode ZD1, and an anode of the voltage stabilizing diode ZD1 is grounded. The third resistor R3 has a current-limiting function.

In other embodiments, the voltage stabilizing diode ZD1 may be replaced with a piezoresistor, that is, the triode control circuit 1 is composed of a third resistor R3 and a piezoresistor, a first end of the third resistor R3 is connected to the second end of the first resistor R1 and the controlled end of the first triode Q1 respectively, a second end of the third triode R3 is connected to a first end of the piezoresistor, and a second end of the piezoresistor is grounded.

A first end of the second resistor R2 is connected to a common contact of a second end of the first triode Q1, a second end of the first capacitor C1 and a controlled end of the Darlington transistor 2, and a second end of the second resistor R2 is grounded. The second resistor R2 has a current-limiting function.

A second end of the Darlington transistor 2 is connected to a controlled end of the relay K1. In this embodiment, the relay K1 is an electromagnetic relay, one end of an electromagnetic coil of the electromagnetic relay is connected to the second end of the Darlington transistor 2, and the other end of the electromagnetic coil of the electromagnetic relay K1 is grounded.

Further, the protective circuit in this embodiment comprises a second unidirectional conduction element D2, the second unidirectional conduction element D2 has a first end and a second end and allows a current to flow from the first end to the second end, the first end of the second unidirectional conduction element D2 is connected to the other end of the electromagnetic coil of the electromagnetic relay K1, and the second end of the second unidirectional conduction element D2 is connected to one end of the electromagnetic coil of the electromagnetic relay K1. In this embodiment, the second unidirectional conduction element is composed of a second diode D2, an anode of the second diode D2 forms the first end of the second unidirectional conduction element, and a cathode of the second diode D2 forms the second end of the second unidirectional conduction element. The second diode D2, as a flyback diode, can protect the electromagnetic relay K1.

Further, the protective circuit in this embodiment comprises a second capacitor C2, a first end of the second capacitor C2 is connected to the voltage input end IN and the first end of the first unidirectional conduction element D1 respectively, and a second end of the second capacitor C2 is grounded. The second capacitor C2 can realize electrostatic discharge of the input end.

In this embodiment, the first triode Q1 is a PNP triode, and the controlled end, the first end and the second end of the first triode Q1 are a base, an emitter and a collector respectively; the Darlington transistor 2 is a PNP Darlington transistor, and the PNP Darlington transistor is composed of a PNP triodes Q3 and a PNP triode Q4 which are connected in series. The controlled end, the first end and the second end of the Darlington transistor 2 are a base, an emitter and a collector respectively.

The operating principle of the protective circuit is explained, for example, when the protective circuit capable of preventing error voltage access according to the embodiments of the invention operates in a 12V vehicle power system. In the 12V vehicle power system, the range of a normal voltage of the voltage input end IN is 6V-20V. The protective circuit capable of preventing error voltage access according to the embodiments of the invention has five conditions:

Condition 1

A voltage input to the voltage input end IN is the normal voltage, that is, the voltage input to the voltage input end IN is within 6V-20V. In this case, a voltage applied to the voltage stabilizing diode ZD1 is lower than a reverse breakdown voltage of the voltage stabilizing diode ZD1, and the voltage stabilizing diode ZD1 is in an off state, such that a current cannot flow through the base of the PNP triode Q1 (the PNP triode Q1 cannot obtain a desired control current for conduction), and the PNP triode Q1 is turned off. The Darlington transistor 2 is turned on, the electromagnetic coil of the relay K1 is powered on, the contact of the relay K1 is closed, a current input to the voltage input end IN flows through the contact to the voltage output end OUT, and an output voltage Vo of the voltage output end OUT is equal to the input voltage Vin of the voltage input end IN.

Condition 2

A voltage input to the voltage input end IN is lower than the normal voltage, that is, Vin is lower than 6V in this condition. In this case, a voltage applied to the voltage stabilizing diode ZD1 is lower than a reverse breakdown voltage of the voltage stabilizing diode ZD1, and the voltage stabilizing diode ZD1 is in an off state, and the PNP triode Q1 is turned off. The Darlington transistor 2 is turned on, and the electromagnetic coil of the relay K1 is powered on; however, because a current flowing to the electromagnetic coil of the relay K1 is too small, the contact of the relay K1 cannot be closed, the voltage input end IN is disconnected from the voltage output end OUT, and an electric device connected to the voltage output end OUT cannot obtain an operating voltage.

Condition 3

A voltage input to the voltage input end IN is higher than the normal voltage, that is, Vin is higher than 20V in this condition. In this case, a voltage applied to the voltage stabilizing diode ZD1 is greater than a reverse breakdown voltage of the voltage stabilizing diode ZD1, the voltage stabilizing diode ZD1 is turned on and connected to the ground to form a current path from the controlled end of the PNP triode Q1 to the ground and provide a flow path for a control current of the PNP triode Q1, and thus the PNP triode Q1 is turned on. Because the emitter-base bias voltage of the Darlington transistor 2 is clamped to the emitter-collector voltage of the PNP triode Q1, the Darlington transistor 2 is turned off. The electromagnetic coil of the relay K1 is powered off, the voltage input end IN is disconnected from the voltage output end OUT, and an electric device connected to the voltage output end OUT will not be affected by the high DC voltage.

Condition 4

A low AC voltage (such as a 12V/50 HZ AC voltage) is input the voltage input end IN. Under the unidirectional conduction effect of the first diode D1, only the forward voltage of the input AC voltage will be applied to the voltage stabilizing diode ZD1 and is lower than a reverse breakdown voltage of the voltage stabilizing diode ZD1, the voltage stabilizing diode ZD1 is in an off state, and the PNP triode Q1 is turned off. In each positive half cycle of the AC voltage, the first capacitor C1 is charged; in each negative half cycle of the AC voltage, the first capacitor C1 discharges through multiple discharge paths, including a parasitic resistor of the first capacitor C1, the PNP triode Q1 and the Darlington transistor 2 (in this case, the PNP triode Q1 and the Darlington transistor 2 are not turned on, but there is a leaking current flowing through the PNP triode Q1 and the Darlington transistor 2). Before the arrival of the positive half cycle of the next AC voltage, all electric charges on the first capacitor C1 will have been discharged, which means that the terminal voltage of the first capacitor C1 returns to the initial state, so the charging voltage of the first capacitor C1 will never reach the turn-on voltage of the Darlington transistor 2, the electromagnetic coil of the relay K1 will not be powered on, and the voltage input end IN is disconnected from the voltage output end OUT. Because all electric charges on the first capacitor C1 are discharged in each negative half cycle of the AC voltage, voltage accumulation of the first capacitor C1 is avoided, allowing the protective circuit in this embodiment to protect against long-term error access of a high AC voltage.

Condition 5

A high AC voltage (such as a 230V/50 HZ AC voltage) is input to the voltage input end IN.

Each positive half cycle of the input AC voltage has three different working stages. A first stage is a period of time the amplitude of the input voltage Vin rises from 0V to 20V. In the first stage, the voltage stabilizing diode ZD1 is in an off state, the PNP triode Q1 is turned off, a current flows from the voltage input end IN to the ground through the first capacitor C1 and the second resistor R2 to charge the first capacitor C1. When the amplitude of the input voltage Vin reaches 20V, the terminal voltage of the first capacitor C1 will still not be charged to the turn-on voltage of the Darlington transistor 2. A second stage is a period of time from the moment the amplitude of the input voltage Vin exceeds 20V to the moment the amplitude of the input voltage Vin falls to 20V after passing across the voltage peak. In the second stage, the input voltage Vin exceeds 20V, a voltage applied to the voltage stabilizing diode ZD1 is greater than a reverse breakdown voltage of the voltage stabilizing diode ZD1, the voltage stabilizing diode ZD1 and the PNP triode Q1 are turned on, and the first capacitor C1 discharges through the PNP triode Q1 until all electric charges on the first capacitor C1 are discharged. A third stage is a period of time the amplitude of the input voltage Vin falls from 20V to 0V. In the third stage, the voltage stabilizing diode ZD1 is in an off state, the PNP triode Q1 is turned off, a current flows from the voltage input end IN to the ground through the first capacitor C1 and the second resistor R2 to charge the first capacitor C1, but the charging voltage of the first capacitor C1 will not be able to turn on the Darlington transistor 2.

In each negative half cycle of the input AC voltage, the voltage stabilizing diode ZD1 is in an off state, the PNP triode Q1 is turned off, and the first capacitor C1 discharges through multiple discharge paths in a similar way as Condition 4. Before the arrival of the positive half cycle of the next AC voltage, all electric charges on the first capacitor C1 will have been discharged, which means that the terminal voltage of the first capacitor C1 returns to the initial state, so voltage accumulation of the first capacitor C1 is avoided, and the charging voltage of the first capacitor C1 will never reach the turn-on voltage of the Darlington transistor.

To sum up, when the protective circuit in this embodiment operates in Condition 5, the Darlington transistor 2 is always in the off state, the electromagnetic coil of the relay K1 will not be powered on, the voltage input end IN is disconnected from the voltage output end OUT, and an electric device connected to the voltage output end OUT will not be affected by the high AC voltage.

In this embodiment, the capacity of the first capacitor C1 is of the microfarad level, such that the protective circuit in this embodiment can protect against 12 Vac/50 Hz, 24 Vac/60 Hz, 36 Vac/60 Hz, 100 Vac/50 Hz, 110 Vac/60 Hz, 220 Vac/50 Hz and 230 Vac/50 Hz AC voltages. The protective circuit in this embodiment of the invention adopts the first diode D1, the PNP triode Q1 and the Darlington transistor 2 which can withstand high voltages, thus being able to protect against high DC voltages (as high as 500V) and high AC voltages (as high as 230V/50 Hz) at a low cost, and also being able to protect against long-term error access of high DC and AC voltages. The first diode D1 protects the PNP triode Q1 and the Darlington transistor 2. In addition, the protective circuit in this embodiment of the invention uses the relay as a switch and makes full use of the advantages of high-voltage resistance and small on-resistance of the relay, thus having high comprehensive cost performance. If a semiconductor switch is used, either the voltage resistance is low or the on-resistance is large, and the cost is high.

Figure 2:
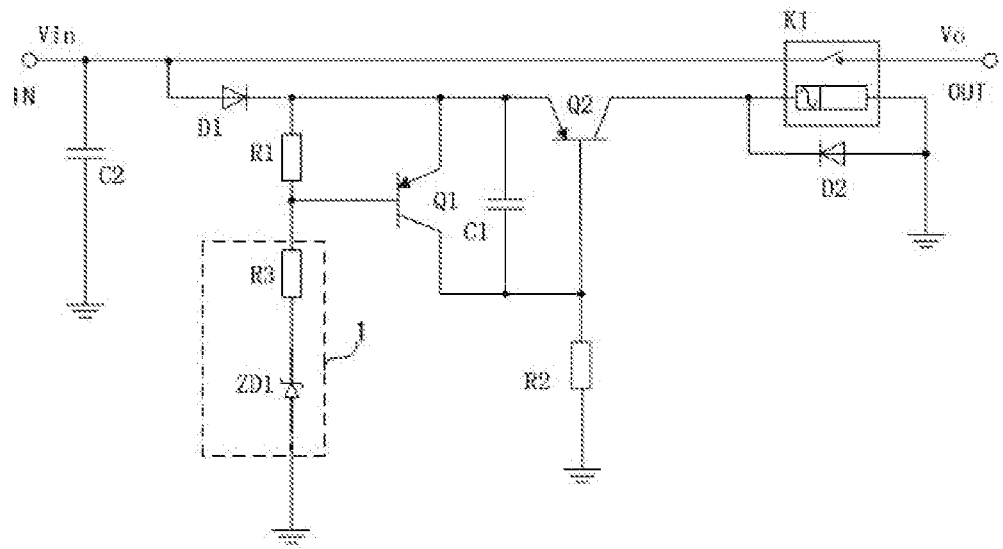
FIG. 2 illustrates a circuit diagram of a protective circuit capable of preventing error voltage access according to a second embodiment of the invention.

FIG. 2 illustrates a circuit diagram of a protective circuit according to a second embodiment of the invention. The second embodiment is different from the first embodiment mainly in that a second triode Q2 is used in the second embodiment to replace the Darlington transistor 2 in the first embodiment. In the second embodiment, the second triode Q2 is a PNP triode. When the voltage resistance and gain of a triode are large enough, the triode can fulfil the same effect as the Darlington transistor.

Figure 3:
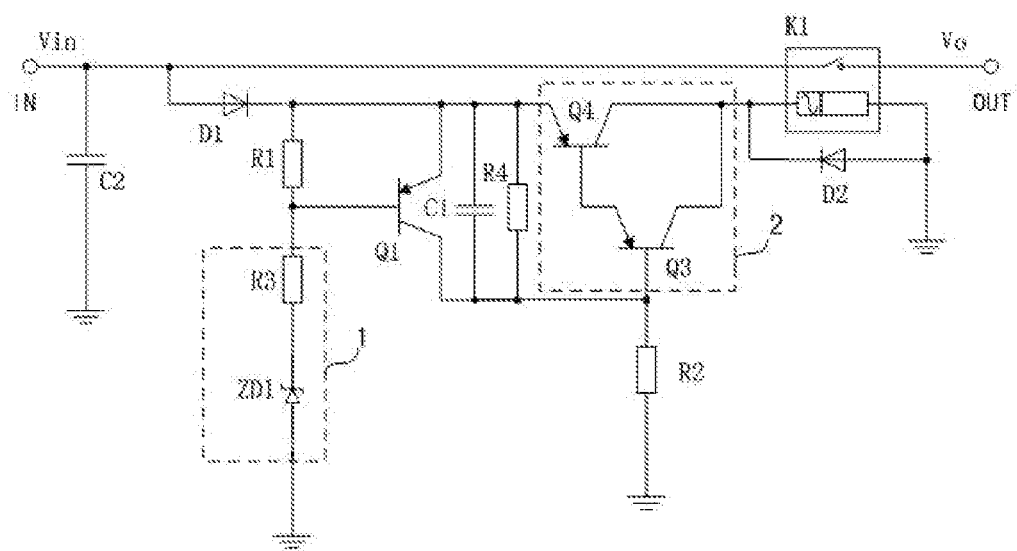
FIG. 3 illustrates a circuit diagram of a protective circuit capable of preventing error voltage access according to a third embodiment of the invention.

FIG. 3 illustrates a circuit diagram of a protective circuit according to a third embodiment of the invention. The third embodiment is different from the first embodiment mainly in that a fourth resistor R4 connected in parallel to the first capacitor C1 is added in the third embodiment. The fourth resistor R4 can increase the discharge rate of electric charges on the first capacitor C1 in the negative half cycle of the AC voltage.

The protective circuit according to the embodiments of the invention can be applied to the power interface of automobiles. When an error voltage (such as a high DC voltage or an AC voltage) is accessed to the power interface of automobiles, the protective circuit can prevent the error voltage from being transmitted to a low-voltage power supply network, thus protecting low-voltage controllers and electric devices in the automobiles from being damaged.

INDUSTRIAL APPLICABILITY

The protective circuit according to the embodiments of the invention is composed of a few of discrete devices, thus being low in cost; when a high DC voltage or an AC voltage within a preset frequency range is input, the relay will be turned off to cut off voltage output, thus protecting post-electric devices.

What is claimed is:

1. A protective circuit capable of preventing error voltage access, comprising a voltage input end, a voltage output end, a first unidirectional conduction element, a triode control circuit, a first triode, a first capacitor, a Darlington transistor or a second triode, a first resistor, a second resistor and a relay;
   a normally open contact of the relay is connected in series between the voltage input end and the voltage output end;
   the first unidirectional conduction element has a first end and a second end and allows a current to flow from the first end to the second end, the first end of the first unidirectional conduction element is connected to the voltage input end, and the second end of the first unidirectional conduction element is connected to a first end of the first resistor, a first end of the first triode, a first end of the first capacitor, and a first end of the Darlington transistor or the second triode respectively;
   a first conduction end of the triode control circuit is connected to a second end of the first resistor and a controlled end of the first triode respectively, and a second conduction end of the triode control circuit is grounded; the triode control circuit is used for disconnecting the first conduction end from the ground when a voltage of the voltage input end is lower than or equal to a preset voltage, and connecting the first conduction end to the ground to turn on the first triode when the voltage of the voltage input end is higher than the preset voltage;
   a first end of the second resistor is connected to a common contact of a second end of the first triode, a second end of the first capacitor and a controlled end of the Darlington transistor or the second triode, and a second end of the second resistor is grounded;
   a second end of the Darlington transistor or the second triode is connected to a controlled end of the relay.

2. The protective circuit capable of preventing error voltage access according to claim 1, wherein the triode control circuit comprises a third resistor and a voltage stabilizing diode;
   a first end of the third resistor is connected to the second end of the first resistor and the controlled end of the first triode respectively, a second end of the third resistor is connected to a cathode of the voltage stabilizing diode, and an anode of the voltage stabilizing diode is grounded.

3. The protective circuit capable of preventing error voltage access according to claim 1, wherein the triode control circuit comprises a third resistor and a piezoresistor, a first end of the third resistor is connected to the second end of the first resistor and the controlled end of the first triode respectively, a second end of the third resistor is connected to a first end of the piezoresistor, and a second end of the piezoresistor is grounded.

4. The protective circuit capable of preventing error voltage access according to claim 1, wherein the relay is an electromagnetic relay, one end of an electromagnetic coil of the electromagnetic relay is connected to the second end of the Darlington transistor or the second triode, and the other end of the electromagnetic coil of the electromagnetic relay is grounded.

5. The protective circuit capable of preventing error voltage access according to claim 4, wherein the protective circuit comprises a second unidirectional conduction element, the second unidirectional conduction element has a first end and a second end and allows a current to flow from the first end to the second end, the first end of the second unidirectional conduction element is connected to the other end of the electromagnetic coil of the electromagnetic relay, and the second end of the second unidirectional conduction element is connected to the one end of the electromagnetic coil of the electromagnetic relay.

6. The protective circuit capable of preventing error voltage access according to claim 5, wherein the second unidirectional conduction element is composed of a second diode, an anode of the second diode forms the first end of the second unidirectional conduction element, and a cathode of the second diode forms the second end of the second unidirectional conduction element.

7. The protective circuit capable of preventing error voltage access according to claim 1, wherein the first unidirectional conduction element is composed of a first diode, an anode of the first diode forms the first end of the first unidirectional conduction element, and a cathode of the first diode forms the second end of the first unidirectional conduction element.

8. The protective circuit capable of preventing error voltage access according to claim 1, wherein the protective circuit comprises a second capacitor, a first end of the second capacitor is connected to the voltage input end and the first end of the first unidirectional conduction element respectively, and a second end of the second capacitor is grounded.

9. The protective circuit capable of preventing error voltage access according to claim 1, wherein the first triode is a PNP triode, and the controlled end, the first end and the second end of the first triode are a base, an emitter and a collector respectively.

10. The protective circuit capable of preventing error voltage access according to claim 1, wherein the second triode is a PNP triode, and the controlled end, the first end and the second end of the second triode are a base, an emitter and a collector, respectively;
    the Darlington transistor is a PNP Darlington transistor, the controlled end, the first end and the second end of the Darlington transistor are a base, an emitter and a collector respectively.

11. The protective circuit capable of preventing error voltage access according to claim 10, wherein the Darlington transistor is composed of two PNP triodes connected in series.

12. The protective circuit capable of preventing error voltage access according to claim 1, wherein the protective circuit comprises a fourth resistor connected in parallel to the first capacitor.

* * * * *